United States Patent

Rizer et al.

[11] Patent Number: 4,504,320
[45] Date of Patent: Mar. 12, 1985

[54] LIGHT-WEIGHT CEMENTITIOUS PRODUCT

[75] Inventors: Janine M. Rizer, Mechanicville; Carl Gotzmer, Accokeek, both of Md.

[73] Assignee: Research One Limited Partnership, Towson, Md.

[21] Appl. No.: 535,479

[22] Filed: Sep. 26, 1983

[51] Int. Cl.$^3$ .................................................. C04B 7/02
[52] U.S. Cl. ........................................ 106/98; 106/99; 106/DIG. 1
[58] Field of Search ................ 106/97, 98, 99, DIG. 1

[56] References Cited

U.S. PATENT DOCUMENTS

| | | | |
|---|---|---|---|
| 4,088,808 | 5/1978 | Cornwell et al. | 106/99 |
| 4,118,239 | 10/1978 | Gagin | 106/99 |
| 4,293,343 | 10/1981 | Shannon | 106/99 |
| 4,310,486 | 1/1982 | Cornwell et al. | 106/98 |
| 4,384,896 | 5/1983 | Aitchin et al. | 106/98 |

Primary Examiner—Howard S. Williams
Assistant Examiner—Terryence Chapman
Attorney, Agent, or Firm—Lawrence I. Field

[57] ABSTRACT

A glass-fiber reinforced light-weight cementitious product having a density of less than 85 pounds per cubic foot, a high tensile strength and a high compressive strength, when cured, and hence, suitable for structural articles in which such properties are required. The product is formulated from a mixture in which the aggregate comprises substantially equal parts by weight of fly ash cenospheres and silica fume.

6 Claims, 4 Drawing Figures

LIGHT-WEIGHT CEMENTITIOUS PRODUCT

This invention relates to a light-weight cementitious product exhibiting a desirable combination of physical properties. More particularly, it relates to a glass fiber reinforced cementitious composite material having a weight of less than 85 pounds per cubic foot, a tensile strength when cured of at least 600 psi, and a compressive strength when cured of at least 10 times the tensile strength and which is especially useful when cast into structural articles in which such a combination of properties is desirable.

Light-weight cementitious composites are known in which the desired weight reduction as compared with concrete is achieved by the use of light-weight aggregates, e.g., as described in U.S. Pat. No. 3,782,985 and elswhere in the literature, but articles made of such materials usually possess tensile strengths on the order of 200 psi, which is much too low for many applications where other properties of the material would appear to make it an attractive candidate for widespread applications.

Efforts to increase the strength of such materials, e.g., by the incorporation of fibers have not proven entirely successful. When organic fibers are used the properties are often altered as the fibers degrade and when inorganic fibers. e.g., glass fibers, are used it has been found that the alkaline materials in the cement chemically attack the glass and weaken it unless specially formulated glasses are used—which adds to the cost of the mixture. Furthermore, when large amounts of glass fibers are included in the mixture it becomes difficult to mix the constituents so as to achieve the uniformity required for avoidance of failures due to improper distribution of the constituents of the mixture.

The present invention is directed to composites which possess the desired strength and which can be formulated with ease.

One object of the invention is to provide a light-weight fiberglass reinforced cementitious material with a tensile strength of at least 600 psi and a density of less than 85 pounds per cubic foot.

Another object of the invention is to provide a mode of formulating a mixture from which light-weight, high strength articles may be poured.

Further objects will become apparent or will be pointed out in the description which follows in which preferred embodiments of the invention are described taken in connection with the drawings in which.

Figure 1:
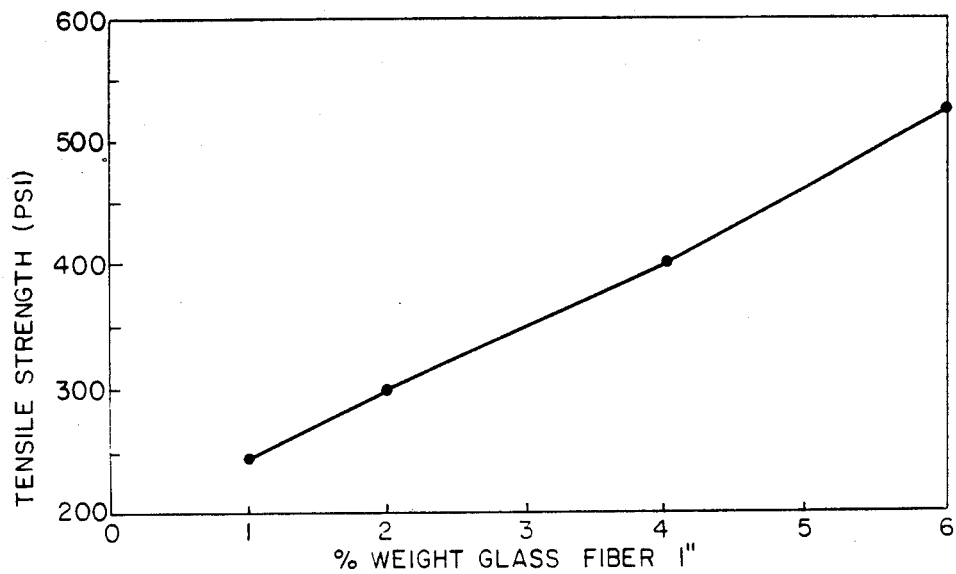
FIG. 1 is a graph showing the effect of glass fiber on tensile strength.

Briefly, the cementitious composites of this invention are formulated from the following classes of materials:
A. Portland Cement
B. Aggregate
C. Admixture
D. Reinforcement
E. Water Each of these will be described in greater detail.

A. Portland Cement

While it appears that any of the various grades of Portland Cement which are commercially available are suitable for the production of the material of this invention, Type III Portland Cement is preferred because it produces products with high early strength. The Portland Cement component comprises between 37 and 30% of the mixture by weight, about 33.67% being particularly preferred. Too much cement increases the product density and too little cement yields products which are too weak.

In some instances, a mixture of Type III and Type I Portland Cements may be used instead of Type III alone. The selection of the grade of Portland Cement depends to some extent on the chemistry of the glass fiber and the chemistry of the aggregate which is used and on the density desired in the product.

B. Aggregate

In the present invention, a mixture of aggregates is used comprising substantially equal parts by weight of fly ash cenospheres and silica fume.

The fly ash cenospheres are commercially available as Fillite and are described in U.S. Pat. No. 3,782,985, the disclosure of which is incorporated by this reference. Preferably, cenospheres of a size between 1 micron and 300 microns are employed as the aggregate in this invention.

The chemically active silica fume used in the mixture which produces the cementitious composite material of this invention is preferably an amorphous, non-crystalline, pozzolanic silicon dioxide and is preferably condensed silica fume. This condensed silica fume is produced as a byproduct in the electric arc furnace production of silicon or silicon alloys such as ferrosilicon. The gases which are evolved during the manufacture of ferrosilicon from quartz, coke and iron ore when they are heated to about 2000° C. contain Si and SiO vapors which form $SiO_2$ when they react with air as they emerge from the furnace. These vapors condense and the very tiny spherical particles which result from condensation of the vapors are almost entirely amorphous silica with a 20–15 $m^2/g$ surface area. Typically, the particles analyze 85–92% $SiO_2$, and the remainder being small amounts of alumina, lime and magnesia. The particles range from 0.01 to 0.3 micron with about 70% being smaller than 0.1 micron. This material is also described in U.S. Pat. No. 4,321,243 issued Mar. 23, 1982.

This constituent is believed to have pozzolanic properties in the present composition. Although in itself it possesses little or no cementitious value, it will, at ordinary temperatures, in the presence of moisture, chemically react with calcium compounds to form compounds possessing cementitious proprerties. Two such possible reactions involving the finely divided silica fume and leading to the production of tobermorite might be the following:

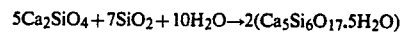

$$5Ca_2SiO_4 + 7SiO_2 + 10H_2O \rightarrow 2(Ca_5Si_6O_{17} \cdot 5H_2O)$$

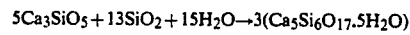

$$5Ca_3SiO_5 + 13SiO_2 + 15H_2O \rightarrow 3(Ca_5Si_6O_{17} \cdot 5H_2O)$$

Furthermore, the use of silica fume in the mixture confers additional benefits. Because it is so finely divided, it helps to fill any interstitial voids in the mixture and because it is chemically reactive it reacts with any Ca(OH)$_2$ present, or which forms from the hydrolysis of calcium silicates in the Portland Cement, and therefore counteracts the known deleterious effects which are produced when free Ca(OH)$_2$ or free CaO are present in cements.

The amount of condensed silica fume in the mixture is substantially equal to the weight of fly ash cenospheres and should be between 22 and 19.5% by weight and 20.74% is a preferred amount.

C. Admixture

Two additives are included in the formulation in order to enhance the properties of the final product, namely a super plasticizer sold as Mighty 100 and an antifoaming agent, Tri-n-butyl phosphate.

To make the final mixture more fluid and to permit better wetting and mixing, a plasticizer is included in the composition, the preferred plasticizer being sold as Mighty 100 or Mighty 150, the active ingredient of which is the sodium salt of formaldehyde condensate of naphthalene beta-sulfonic acid. Mighty 100 is available as a powder. Mighty 150 is available as a liquid. While it is not intended to be bound by any theoretical explanation, it is believed that the superplasticizer affects the zeta potential of the mixture and prevents flocculation. It also appears to increase the strength of the product by permitting the use of smaller amounts of water. Other known plasticizers may be used in place of Mighty 100 or Mighty 150 to disperse the silica fume in the mixture. Amounts up to about 3% by weight have proven beneficial and a particulaly preferred amount is about 1.4% by weight.

The composite produced from the above admixture is also improved by the incorporation of an antifoaming agent, Tri-n-butyl phosphate, being the preferred additive, the purpose of which is to reduce the amount and size of air pockets created or trapped in the final cementitious composite material which would impair the physical properties. The amount of antifoaming agent in the mixture should be up to about 0.074% by weight, 0.037% by weight being a preferred amount.

D. Reinforcement

The desired strength is obtained by including glass fiber in the composition as a reinforcement. Various types of glass may be used, type E glass being particularly preferred. The glass fiber should be chopped into short lengths preferably shorter than ¼". The strength increases with the glass fiber content. Amounts up to 6% have been found quite satisfactory, as shown in FIG. 1.

E. Water

Water, preferably distilled water, is the final constituent of the mixture required to produce the high strength composite of this invention. The preferred amount should be less than 18.64% and not less than about 10%.

The relative proportions of the several ingredients are as follows (in percent by weight):

|  | Range | Preferred |
|---|---|---|
| Portland Cement | 30–37 | 33.67 |
| Aggregate |  |  |
| Cenospheres | 19–22 | 20.90 |
| Silica Fume | 19–22 | 20.74 |
| Admixture |  |  |
| Mighty 100P | up to 3 | 1.4 |

|  | Range | Preferred |
|---|---|---|
| Tri-n-butyl Phosphate | up to 0.074 | 0.037 |
| Glass Fibers | 4–12 | 4.54 |
| Water | 10–18.7 | 18.64 |
| Water/Portland Cement |  | 0.55 |
| Water/aggregate |  | .13 |
| water/Cement & Silica Fume | .20–.34 |  |

Preparation

The Mighty 100 (144 parts by weight) was added to 1920 parts by weight of water and then 3.48 parts by weight of Tri-n-butyl phosphate were added. Then the silica fume (2156 parts) cement (3468 parts) and fly ash cenospheres (2160 parts) were added in turn and stirred into the water containing the two additives. Finally, 468 parts by weight of chopped glass fiber were stirred into the mixture. The resulting composite material was poured into molds and cured in a moist box for 24 hours and then aged in a steam box at 140° F.

Figure 2:
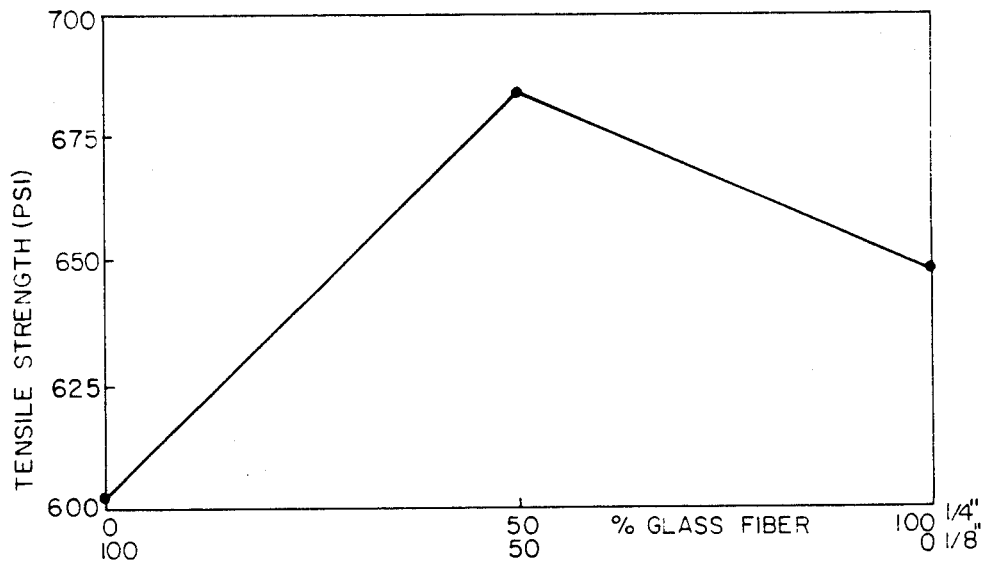
FIG. 2 is a graph showing the effect of glass fiber length on tensile strength.

In preparing the mixture, it was found that the flow decreased as the glass fiber content in the mixture increased, but since the strength appeared to increase with the glass fiber content, it was necessary to find a way to incorporate the fibers without losing the flow. This has been accomplished by chopping the fibers so that the pieces did not exceed ¼" in length and by adding the fibers to the mixture last when the ingredients are brought together. It was further found that a mixture of substantially equal parts (by weight) of ¼" pieces and ⅛" pieces produced a product with a maximum reinforcement as shown in FIG. 2.

The mix is prepared generally in accordance with ASTM Procedure C 305 for Mechanical Mixing of Hydraulic Cements (Part 5) as may be seen from the following example in which the order of addition and proportions are believed to be essential in order to obtain the desired properties.

The mixture was prepared in a mixing bowl equipped with a planetary action paddle mixer (Hobart mixer—ASTM Standard C-305-80) by mixing water with the superplasticizer and the Tri-n-butyl phosphate. Then the silica fume was added to the mixture, followed by addition of the Portland Cement, cenospheres and glass fibers in that order.

Figure 3:
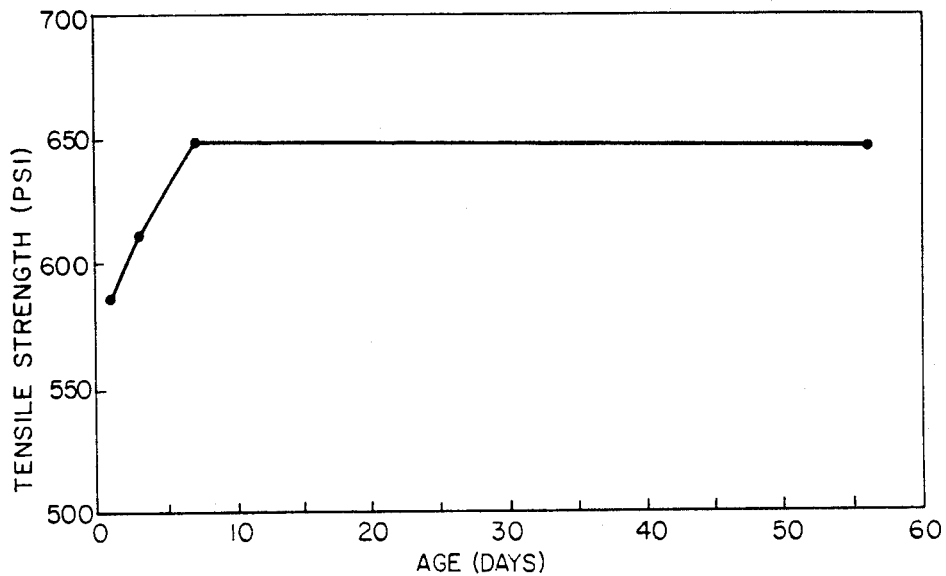
FIGS. 3 and 4 are graphs showing the change in tensile strength and comressive strength versus time for a particular composition.
Figure 4:
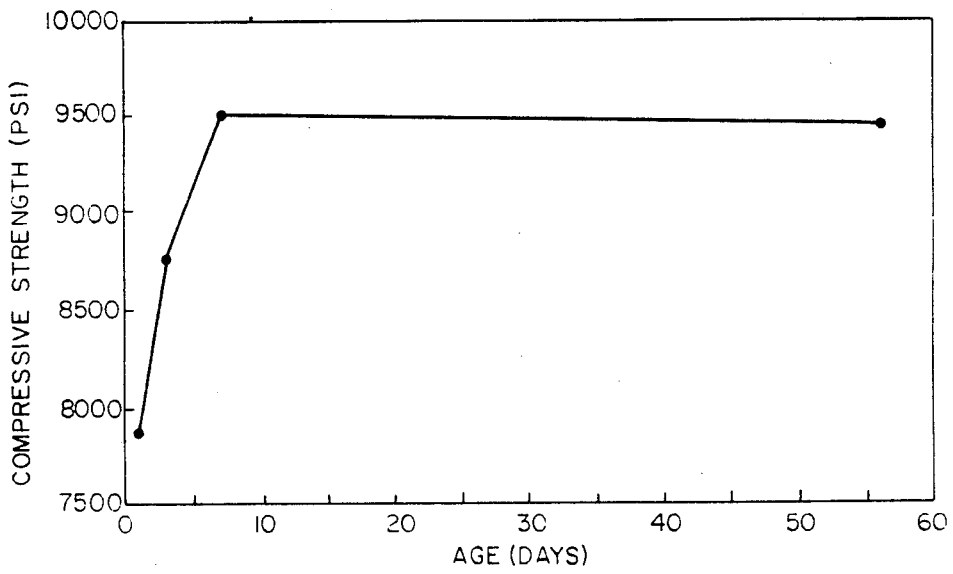

The resulting mixture was placed into a brass mold and permitted to cure in a moist box for 24 hours at room temperature, then it was put in a steam box and cured at 60 degrees centigrade for 24 hours. The result was a composite which possesses the combination of properties described below and which retains these properties for extended periods of time as shown in FIGS. 3 and 4. The properties of the composites were as follows:

|  | Aged (days) | | | | |
|---|---|---|---|---|---|
|  | 1 | 3 | 7 | 28 | 56 |
| Density (lbs./cu.ft) | 80.9 | 81.7 | 81 | 81 | 82 |
| Compressive Strength (psi) | 7875 | 8750 | 9500 | 9583 | 9458 |
| Tensile Strength (psi) | 586 | 610 | 648.6 | 555 | 647 |

Because of the comparatively high tensile and compressive strengths the product was particularly suited to use an industrial pallet. Having now described a preferred embodiment of this invention, it is not intended that it be limited except as may be required by the appended claims.

We claim:

1. A light-weight cementitious product exhibiting a density of less than 85 pounds per cubic foot, a tensile strength, after curing, of at least about 600 psi, and a compressive strength of at least 10 times the tensile strength, comprising a cement matrix, and aggregate consisting of substantially equal parts of fly ash cenospheres and silica fume and reinforced with chopped glass fibers, said chopped glass fibers not exceeding ⅛" in length.

2. The product of claim 1 in which the pieces of chopped glass fibers were a mixture of substantially equal parts by weight as pieces about ⅛" in length and pieces about ¼ in length.

3. The product of claim 1 in which the relative proportions of the constituents are in percent by weight:

| | |
|---|---|
| Cement | 30–37% |
| Aggregate (cenospheres & Silica fume 1:1) | 38–44 |
| Chopped Glass Fibers | 4–12 |
| and up to 19% Water | |

4. The product of claim 3 in which the glass fibers constitute about 6% of the product, by weight.

5. The product of claim 3 in which the relative proportions of the constituents are in percent by weight:

| | |
|---|---|
| Portland Cement | 33⅔ |
| Aggregate (cenospheres and silica 1:1) | 41⅔ |
| Glass Fibers | 6 |
| Water | to make 100% |

6. Compositions which when cured produce cement products with a density of less than 85 pounds per cubic foot, a tensile strength of at least about 600 psi, and a compressive strength of at least ten times the tensile strength and which comprises the following ingredients in percent by weight:

| | Range | Preferred |
|---|---|---|
| Portland Cement | 30–37 | 33.67 |
| Aggregate | | |
| Cenospheres | 19–22 | 20.90 |
| Silica Fume | 19–22 | 20.74 |
| Admixture | | |
| Mighty 100P | up to 3 | 1.4 |
| Tri-n-butyl Phosphate | up to 0.074 | 0.037 |
| Glass Fibers | 4–12 | 4.54 |
| Water | 10–18.7 | 18.64 |
| Water/Portland Cement | | 0.55 |
| Water/aggregate | | .13 |
| water/Cement & Silica Fume | .20–.34 | |

* * * * *